Jan. 30, 1968     A. B. GROSE     3,365,910
APPARATUS FOR MAKING FLUFFY ICE CREAM
Filed March 17, 1965
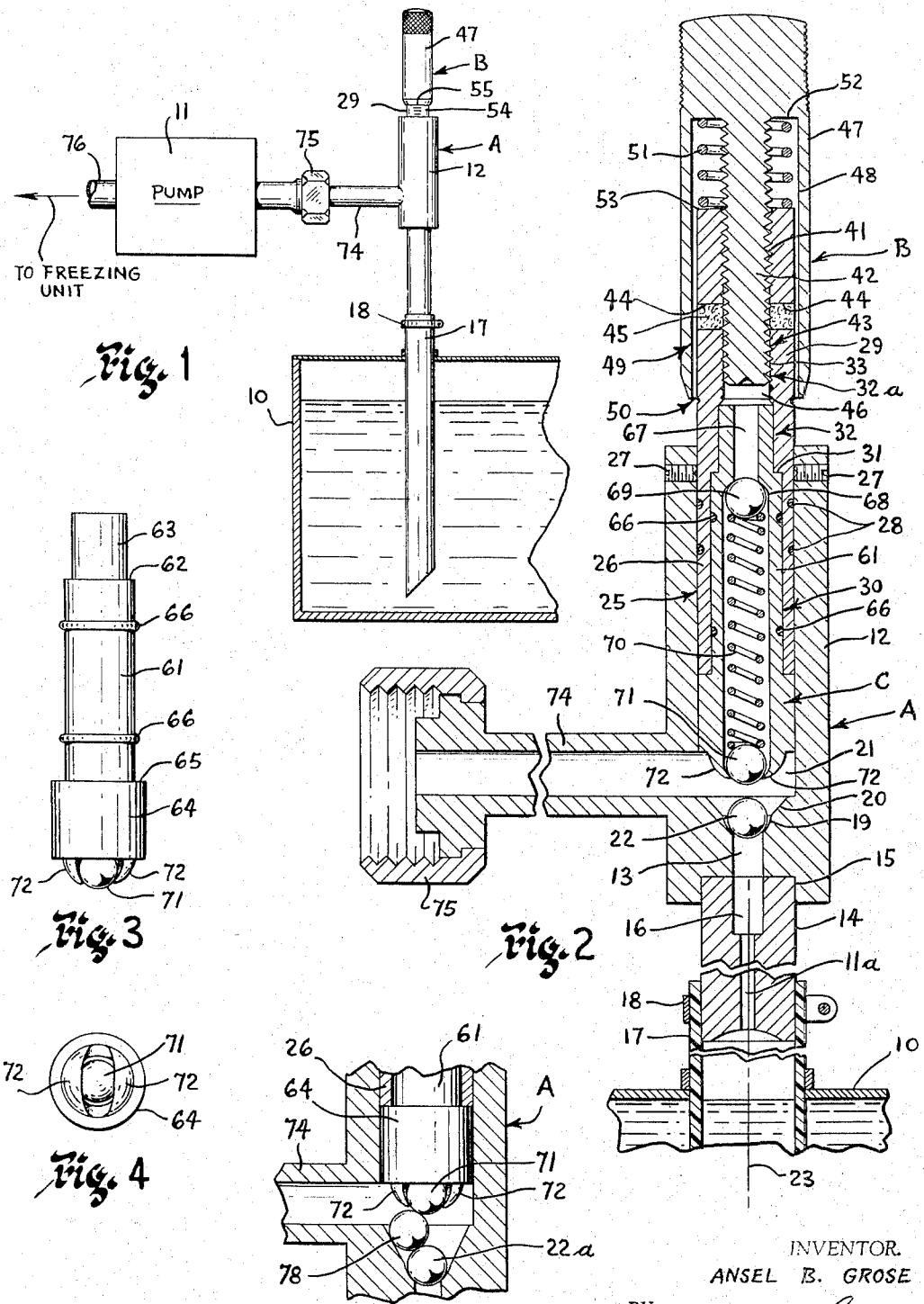
INVENTOR.
ANSEL B. GROSE
BY Louis L. Gagnon
ATTORNEY

United States Patent Office 3,365,910
Patented Jan. 30, 1968

3,365,910
APPARATUS FOR MAKING FLUFFY
ICE CREAM
Ansel B. Grose, 8 Mt. Vernon St.,
Stoneham, Mass. 02180
Filed Mar. 17, 1965, Ser. No. 440,411
3 Claims. (Cl. 62—306)

This invention relates to an improved method of making and dispensing frozen fluffy ice cream, ice milk, sherbet and like products, which will hereinafter be referred to as fluffy cream, and to novel apparatus for dispensing the same.

It is commonly known that several different methods and apparatus have been devised for dispensing frozen fluffy cream, all of which strove to overcome one or more of the defects encountered in previously proposed methods and devices.

The most desirable arrangement is that of providing a method and apparatus which will prevent contamination of the resultant dispensed product, that will maintain a desirable consistence of the dispensed product, and that will maintain uniformity in the dispensing of the product by obviating explosive effects which with prior art devices caused the fluffy frozen cream to splash over the wearing apparel of the operator and adjacent equipment when the draw-off valve is opened for dispensing following an idle period of the device.

One of the most recently devised methods and apparatus which overcomes several of the defects of prior art methods and apparatus is that of providing a two free floating ball valve arrangement in combination with a relatively large by-pass mixing chamber which is not in the direct flow of the liquid mix. A first ball valve is intended to drop under the action of gravity to prevent the high pressure mix from being forced back from the high pressure freezing unit into the mixing chamber and into the air metering valve and the second ball valve is intended to drop under the action of gravity to prevent the liquid mix from leaking back to the main supply receptacle thereby causing loss of prime of the vacuum pump used in such systems.

The major problem, however, with the two free floating ball valve method and apparatus defined above is that the liquid mix contains small particles which, in several instances, become lodged between the balls and their valve seats. When the first mentioned ball valve fails to close and permits flow back of the mix into the mixing chamber it causes flooding and clogging of the air metering valve. If the second mentioned ball valve fails to close it allows the mix to leak back into the main supply receptacle and causes the vacuum pump, used with such devices, to lose its prime.

The result of a clogged or partially clogged air valve is that when the draw-off valve is opened, in the usual manner of dispensing, little or no air is drawn into the liquid mix, the end product is thick, poorly flavored and costly to the dispensor. The dispensed product may also become contaminted if the dispensing device is idle for a considerable period of time due to the fact that the by-pass chamber is not in the direct flow of the mix.

In the instance where the second ball valve, which is intended to prevent the mix from leaking back into the main supply receptacle, fails to close and the air valve is still operative, excess air is drawn into the freezing unit and causes an undesirable explosive effect and splashing of the half frozen cream over the operator and adjacent equipment when the operator again opens the draw-off valve in the process of serving a customer.

The above defects not only require the disassembling and thorough cleaning and reassembling of the parts but also a repriming of the vacuum pump, all of which is time consuming and costly and has occured several times a day in the past.

The prime object of the present invention is directed to the provision of a novel method and apparatus which overcomes the above defects through the provision of a spring loaded ball valve associated with the metering valve for allowing a controlled amount of air to be continuously drawn through said metering valve into the mixing chamber when the conventional mix pump is operating. The spring loaded valve will positively prevent air and liquid mix leaking back and gaining access to the air metering valve when the mix pump ceases to operate.

Another object is to provide a ball valve for allowing liquid mix to be drawn into the mixing chamber from the main source of supply when the pump is operating and which will more positively prevent leakage of said mix back to said source when the pump ceases to operate.

Another object is to control the related dimensional characteristics of the ball valve and its valve seat with respect to the dimension of the orifice through which the liquid mix is sucked when the mix pump is operating so as to cause the ball to spin at a high velocity, which spinning action not only has a self cleansing action for the ball and its valve seat to insure a more positive contact and closing thereof when the pump ceases to operate, but also has a whipping action which causes a more uniform mixture of the air and liquid mix prior to its being drawn into the pump and freezing unit.

Another object is reduce the size of the mixing chamber so as to permit it to be more readily cleared of mix at the starting cycle of dispensing.

Another object is to provide a device of the above nature which may be more readily flushed and cleansed when required.

Another object is to provide a method of making fluffy frozen cream which comprises the step of whipping the liquid mix during the combining thereof with air in the mixing chamber to produce a more homogeneous and finer textured product prior to its being drawn into the mix pump and freezing chamber.

Another object of the invention is to provide the spinning ball valve, which functions to whip the liquid mix being drawn therethrough, with an additional ball which not only functions to increase the whipping action but also functions as a weight to obtain a more rapid and positive closing of the valve, particularly when the liquid mix is of a more viscous nature.

Other objects and advantages of the invention will become apparent from the following description taken in connection with the accompanying drawings, wherein:

FIG. 1 is a diagrammatic elevational view of the device embodying the invention;

FIG. 2 is an enlarged sectional view of the unit A of FIG. 1;

FIG. 3 is a side elevational view of the valve assembly which is associated with the air metering valve;

FIG. 4 is a view showing the lower end of the valve assembly; and

FIG. 5 shows a fragmentary sectional view of a modifield form of the invention.

The device embodying the invention is directed particularly to the provision of means for controlling the volume and rate of air that is permitted to enter the liquid mix drawn into unit A from a liquid mix storage tank 10 in response to a vacuum suction created by the mix pump 11. The said pump also forces the air-liquid mix, hereinafter called overrun, from said mixing unit into the freezing unit of a conventional device for dispensing fluffy cream. The mix pump is of a conventional type and may be of any given controlled capacity according to the requirements of a particular installation. The frozen cream or the like is dispensed in the usual manner through a conventional manually operated draw-off valve not shown in the drawing.

The device A embodying the invention comprises a hollow housing 12 having a restricted passageway 11a therein communicating with a metering expansion chamber in the lower end thereof, each being of a diameter and length controlled in accordance with the capacity of pump 11 required to be used in the particular installation. For example, if the pump is of a type for pumping twenty gallons of finished product per hour and the ball valve is 7/16 of an inch in diameter, the diameter of the liquid mix metering passageway 11a would be approximately 1/2" and approximately 2" in length. The metering passageway communicates with the expansion chamber which comprises aligned portions 13 and 16 the length of which is determined by a step 14 which is press fitted within a counterbore 15 and which has the portion 16 therein. In this instance the expansion chamber is 3/8 of an inch in diameter and 3/4 of an inch in length. The passageway 11a therefore meters the flow of liquid mix into the expansion chamber. The fact that the passageway is smaller in diameter than the expansion chamber the speed of flow of the liquid mix therethrough is relatively high and causes the mix to enter the expansion chamber in the form of a spray thereby causing the mix to expand and be more uniform in its consistancy prior to being drawn through the ball valve 22 and will permit the air to be more readily mixed therewith.

The stem 14 is connected by a suitable pipeline 17 which extends into the liquid mix storage tank 10, as shown in FIG. 1. The said pipeline 17 may be in the form of a hose or other line which is held on the stem by a suitable clamp band 18. The metering passageways 13 and 16 may be of a fixed metering diameter in accordance with the requirements of a particular installation.

The passageway 13 communicates with a curved valve seat 19 which, in turn, communicates with a hollow tapared section 20. The hollow tapered section communicates with the mixing chamber 21 which is restricted in size and in the direct path of the flow of the mix thus completely clearing and changing the mix in the mixing chamber at each opening of the draw-off valve during the dispensing of the fluffy cream. This prevents contamination of the product and keeps the mix chamber sanitary at all times. A small ball valve 22 of a given selected size is located within the curved valve seat 19 and is adapted to have line contact therewith.

The essence of this particular part of the invention is that the passageway 13, curvature of the valve seat 19, angle of the tapered section 20 and diameter of the ball valve 22 are carefully controlled as to their related dimensions and in accordance with capacity of pump whereby the ball, when lifted from the valve seat by the pump, will spin at a high velocity. The function of this high velocity spinning is an important feature of the invention as will, hereinafter, be more clearly defined.

While the ball valve 22 may be of different sizes, in accordance with the capacity of the pump, it has been found, in order to produce maximum efficiency with different capacities of pumps, that the passageways 13 and 16 be circular and of a diameter of from 80% to 85% that of the diameter of the ball valve 22.

In other words, if the ball valve 22, as given in the following example, is of stainless steel of about .09 gram in weight and of a diameter of about 7/64 of an inch (.1093 of an inch) the diameter of the passageways 13 and 16 will be from about .085 to .093 of an inch. The relatively narrow curved valve seat 19, in this instance, is controlled to be from about .004 to .006 of an inch larger in curvature than the curvature of ball valve 22 or approximately 4% larger in curvature than said ball valve. The curved valve seat 19 is of about .015 to .030 of an inch in width.

The preferred angle of the hollow tapered section 20, with the above dimensions, is approximately 41° with respect to the longitudinal axis 23 of the passageways 13 and 16. This permits the ball 22 to have line contact with the valve seat 19 and provides clearance on all sides of the ball 22 to reduce molecular attraction and to cause the ball to spin rapidly when lifted from its seat by the suction of the pump 11. This spinning action results from maintaining the related proportion of the parts given above.

The housing 12 has an internal bore 25 in which the hollow neck 26 of an air metering device B extends and is secured therein by set screws 27. Suitable O rings 28 mounted in circumferential grooves in the neck 26 provide a seal between the neck and inner wall of the bore 25. The neck is integral with the inner part 29 and the air metering device B is such as defined in A. B. Grose Pat. No. 2,877,802.

The neck 26 and integral part 29 have an internal bore which comprises a relatively long section 30 having an inner shouldered edge 31 which communicates with an intermediate relatively short slightly reduced section 32 and which in turn communicates with a relatively long further reduced section 32a.

The reduced section 32a has a scratch thread 33 formed throughout a portion of its length as indicated in FIG. 2 and a full thread portion 41 formed throughout the remainder of its length. The internally threaded bore section 32a is adapted to receive a core 42 having an outer fully threaded portion threadedly connected with the full threaded portion 41 of the bore and which may be threaded downwardly into threaded relation with the scratch threads 33 whereby a spiral air passageway 43 will be provided between the outer full threads of the core 42 and the flat areas between the scratch threads 33. The inner part 29 is provided with diametrically opposed openings 44 which provide air passageways in communicating relation with the inner bore section 32a.

If desired, suitable air filtering means 45 may be placed in said openings to filter the air passing therethrough. The scratch threads extend from the said openings 44 to a location 46 spaced a controlled distance above the top of the intermediate bore section 31 and are of a length suffiicent to provide the desired air metering effect by threading the core inwardly or outwardly of said scratch threads as controlled by the fully threaded portions of the core and bore sections 32a. The core 42 has a cap 47 integrally connected thereto and which has a bore 48 of a controlled diameter greater than the diameter of the inner part 29 to provide an air passageway 49 surrounding said inner part 29.

The cap member 47 extends downwardly in overlying relation with the diametrically opposed openings 44 whereby air must be drawn upwardly between said cap member and the inner part 29, as indicated by the arrow 50. The air is thence drawn through the diametrically opposed openings 44 downwardly through the spiral passageway formed by the communicating relation of the full threads of the core 42 and the scratch threads 33. The length of the spiral passageway may be varied by threading the core inwardly or outwardly of the scratch threads whereby the rate of flow of air therethrough may be varied as will be more clearly defined hereinafter.

To hold the cap member 47 in adjusted position there is provided a coil spring 51 surrounding the core 42 and which engages the top inner wall 52 of the cap 47 at one end thereof and which engages the end 53 of the upright 35 at its opposite end. The coil spring frictionally retains the cap 47 in adjusted position and the said inner part 29 is provided on the exterior thereof with a suitable scale 54 and the cap is provided with a suitable indication mark 55 whereby the said adjustment of the cap and length of the spiral passageway may be determined.

The bore sections 30, 32 and 32a are axially aligned with the longitudinal axis 23 of the passageways 13 and 16.

The bore sections 30 and 32 house a valve unit C which comprises a hollow tubular part 61 having an upper shouldered edge 62 and an upwardly extending reduced portion 63. The hollow tubular part 61 further has an enlarged lower end portion 64 also provided with an upper shouldered edge 65.

The parts 61 and 63 are so dimensioned as to fit snugly within the respective bore sections 30 and 32 with the shouldered edge 62 engaging the inner shoulder 31, as shown in FIG. 2. The enlarged end 64 is so dimensioned as to fit snugly within the housing 12 with the upper shouldered edge 65 engaging the lower end of the neck 26. Suitable O rings 66, fitted in circumferential grooves formed in the tubular part 61, provide a seal between said part and the inner wall of the hollow neck 26.

The hollow tubular part 61 has a reduced passageway 67 internally thereof which communicates with a curved valve seat 68 at its upper end. A ball valve 69 of a curvature slightly less than the curvature of the valve seat is adapted to have line contact with said seat and is held thereagainst by a spring 70 located internally of the tubular part 61. The spring 70 is held in the tubular part by a ball 71 which, in turn, is held in said tubular part by spaced lips 72 which extend downwards of the enlarged end portion 64 and which are spun slightly inwardly, as shown in FIGS. 3 and 4. The lips are so shaped as to allow air to pass freely between them and the ball 71.

The lips 72 and ball 71 are so spaced from the ball valve 22 as to prevent it from becoming dislodged from the valve seat 19 and the tapered section 20 when drawn upwardly from the seat by the suction of the pump 11.

The tension of the spring 70 is controlled so that the suction of the mix pump 11, when operating, will readily permit the ball valve 69 to be drawn from its valve seat 68 so as to draw air through the air metering device B simultaneously to the drawing of liquid mix upwardly through the ball valve 22. The fact that the ball valve 22 spins rapidly during said drawing it causes the air and liquid mix to be thoroughly whipped and mixed prior to its being drawn into the mix pump 11. The whipped mix is drawn from the mixing chamber 21 through a pipe line 74 connected with the chamber by welding or the like and to the pump 11 by a coupling 75, as shown in FIGS. 1 and 2.

The pump 11 is connected to a conventional freezing unit, not shown, by the pipe line 76.

When the pump 11 is not operating and no sucking action is taking place the spring 70 immediately forces the ball valve 69 into engagement with its valve seat 68 thereby preventing air passing upwardly through the valve and simultaneously causes the air to be pocketed in valve unit C and in the chamber 21 so as to prevent any of the mix gaining access to the unit C that might clog the air metering valve B and also cause the pump to lose its prime.

The operation of the device is substantially as follows:

When the mix pump 11 of a given capacity is caused to operate the said pump creates a vacuum in the various passageways in the housing 12 whereby the valves 22 and 69, in response to the pull of the vacuum, will be caused to move from their valve seats and said pull simultaneously causes the liquid mix to be drawn upwardly of the hose line 17 through the restricted metering passageways 13 and 16 which, according to the capacity of the pump 11 are of a combined controlled length and diameter to meter the volume of mix drawn therethrough. The metering of the volume of liquid is such as to cause the vacuum to simultaneously draw air through the air metering valve B into said mix.

For example, if the pump has a capacity for pumping twenty gallons of finished product per hour, the approximate diameter of the combined passageways 13 and 16, would be approximately 1/4" and the combined lengths of said passageways 13 and 16 would be approximately 2" in length and is so computed in accordance with the capacity of the pump and viscosity of the liquid mix to provide the desired volume of liquid mix being drawn through said combined passageways 13 and 16. The air metering valve B is adjusted according to the volume of liquid mix passing through the above-mentioned passageways in order to meter the amount of air simultaneously being drawn into said mix by the pump and thereby produces the proper air-to-liquid mix ratio and consistency of overrun in accordance with the requirement of the particular installation. If the capacity of the pump is changed, the diameter and length of the above-mentioned liquid metering passageways and the air metering valve are varied accordingly. When once formed to meet the requirements of the installation, no further changes are required except to compensate for slight variation in the viscosity of the liquid mix. This, however, may be taken care of by slight adjustments of the air metering valve B.

The term overrun means, as stated above, the related proportion of air-to-liquid mix and the diameter and length of passageways 13 and 16 are controlled in accordance with the viscosity of the liquid mix which, in most instances, has a consistancy and viscosity simular to that of light cream such as is used in coffee. By controlling or metering the volume of the flow of liquid mix through the inlet passageways 13 and 16 and by properly setting the air valve B a consistant uniform finished product is obtained and will be dispensable with no explosive splashes such as has been encountered with prior art arrangements.

It is to be understood, as mentioned above, that if the capacity of the pump 11 is changed, the diameter and length of the inlet passageways would likewise be computed and changed accordingly and proper adjustment of the air valve B would have to be made in order to obtain the proper consistency of overrun and uniform end product.

After once being installed, an overrun of the desired consistency will be maintained. The desired overrun is controlled to obtain varying amounts of air-mix ratios. The preferred ratio, however, would be substantially as follows:

If a pint of liquid mix weighs 20 ounces, the overrun would be controlled to produce an end frozen product in the same pint liquid measure which weighs 10 ounces, thereby producing 100% overrun. This is given only by way of illustration, as the overrun could be varied from 10% to 100% as desired and depending upon what the device is dispensing. This variation may be obtained by computing and controlling the diameter and length of the inlet passageways according to the capacity of the pump and by proper adjustment of the air inlet valve.

It has also been found that with the present device a uniform dispensing of the finished product is attained with the elimination of any excess air being drawn into the mix which in the past has caused the undesired explosive effects as previously mentioned. This end result is accomplished even when the device is continuously or intermittently operated.

During the suction of the liquid mix up into the mixing chamber and the metering of the liquid mix and air, as defined above, the rapid spinning of the ball valve 22 produces a dual function in that it not only whips the liquid mix and air passing into the mixing chamber to produce an initially more homogenous product prior to it being drawn into the main mix pump but also provides a self-cleansing action of the ball valve 22 and its valve seat 19 to insure a more positive closing thereof when the dispensing draw-off valve is closed.

The dual functions of the valves 22 and 69, as defined above constitutes the novel method and apparatus of the present invention.

Another advantage of the present invention is that the parts may be easily disassembled for cleaning or may be initially simply flushed by causing an initial amount of overrun to be drawn through the device before dispensing.

In FIG. 5 there is shown a modification of the invention wherein the ball valve 22a has an additional ball 78 thereon. The remaining structure and function of the device is as described above.

The ball 78 engage the ball 22a and is adapted to spin in the opposite direction to the spinning of said ball 22a. This dual spinning of the balls 22 and 78 causes a more violent whipping action and therefore produces a smoother more homogenous liquid-air-mix, particularly when the liquid mix is of a more viscous nature. The ball 78 may be of the same size or larger than the ball 22 and also functions as a weight to obtain a more rapid and positive closing of said valve when the draw-off valve is closed.

While the method and apparatus described above is adapted particularly for use in the dispensing of fluffy ice cream, ice milk, sherbert or the like, it is to be understood that it may be used with any vacuum operated device and that various modifications of said device may be made without departing from the spirit of the invention as expressed in the accompanying claims.

Having described my invention I claim:

1. A device for the character described comprising the combination of a source of liquid composition, a mixing chamber, a freezing unit, means for drawing said composition from said freezing unit, means connected intermediate said source and said freezing unit for drawing the composition from said source into the mixing chamber and thence along a direct path of flow into the freezing unit, said means embodying a mix pump for creating a suction, an air valve responsive to the operation of said pump for metering air into said mixing chamber simultaneous to the drawing of liquid composition therein, means within said chamber for forcibly causing said metered air to be thoroughly mixed with said liquid composition prior to its being drawn outwardly of said chamber and into said freezing unit, means associated with the air valve for mechanically preventing the air-liquid-mix from gaining access to and possibly clogging said air valve, said means for forcibly causing the meter air to mix with the liquid composition also functioning to prevent the air-liquid-mix leaking back to said source when the means for drawing said air-liquid-mix from said freezing unit is closed, the means for forcibly causing the metered air to be thoroughly mixed with the liquid composition is the ball portion of a ball valve for preventing the leaking back of the air-liquid-mix to the source and which is so designed as to rapidly spin when the liquid composition is being drawn upwardly through the valve and which spinning action whips the combining air and liquid while in the mixing chamber to produce a more homogeneous air-liquid-mix prior to its being drawn into the mix pump.

2. A device as set forth in claim 1 wherein the unit for preventing the air-liquid-mix from gaining access to the air metering valve embodies a tubular member adapted to fit within the bore of the passageway of the air valve, said tubular member having an inner valve seat adjacent its upper end, a ball adapted to engage said seat and a resilient member supported in the tubular member for resiliently holding said ball on said seat, the tension of the resilient member being such as to permit the ball, during the operation of the device, to be drawn away from the seat to allow air to pass through the air metering valve and being such as to immediately force said ball against said seat when no air is being drawn through said air metering valve.

3. A device set forth in claim 2 wherein the resilient member is in the form of a coil spring engaging the ball on the valve seat adjacent the upper end of the tubular member and engaging a second ball adjacent the lower end of said tubular member and held therein by spaced inturned lips which allow air to pass around the major portion of the outer surface of said second ball.

References Cited

UNITED STATES PATENTS

| | | | |
|---|---|---|---|
| 2,981,075 | 4/1961 | Duke et al. | 62—135 X |
| 3,190,082 | 6/1965 | Duke | 62—342 |
| 3,272,132 | 9/1966 | Stoelting et al. | 62—342 X |

ROBERT A. O'LEARY, *Primary Examiner.*

W. E. WAYNER, *Assistant Examiner.*